United States Patent [19]
Schmidt

[11] 3,786,923
[45] Jan. 22, 1974

[54] MARINE WASTE DISPOSAL APPARATUS
[75] Inventor: Ferenc J. Schmidt, Ardmore, Pa.
[73] Assignee: Ametek, Inc., New York, N.Y.
[22] Filed: July 26, 1971
[21] Appl. No.: 166,132

[52] U.S. Cl. ................. 210/152, 210/351, 210/397
[51] Int. Cl. ............................................ B01d 33/30
[58] Field of Search .......... 210/39, 40, 75, 77, 226, 210/350–352, 152, 153, 396, 397

[56] References Cited
UNITED STATES PATENTS

| | | | |
|---|---|---|---|
| 1,604,652 | 10/1926 | Manning | 210/75 X |
| 3,244,621 | 4/1966 | Bouthilet | 210/40 |
| 1,604,651 | 10/1926 | Manning | 210/75 X |
| 3,677,404 | 7/1972 | Staffin | 210/75 X |

Primary Examiner—Samih N. Zaharna
Assistant Examiner—Thomas G. Wyse
Attorney, Agent, or Firm—D. Berner Smythe et al.

[57] ABSTRACT

A filter-adsorption media, such as activated carbon, is supplied to one end of a screw conveyor having a variable pitch along its length with the greater pitch being at the supply end. Sewage, such as from a marine toilet, is passed through a macerator and chemically treated before being introduced into the central portion of the screw conveyor to be mixed with the filter-adsorption media and compacted as the screw conveyor is rotated. The compacting produces a mixture of filter-adsorption media and sludge at the discharge end while the liquid is passed through the conveyor in counter-flow relationship, to the incoming filter-adsorption media and through the filter-adsorption media, and then to a discharge.

1 Claim, 3 Drawing Figures

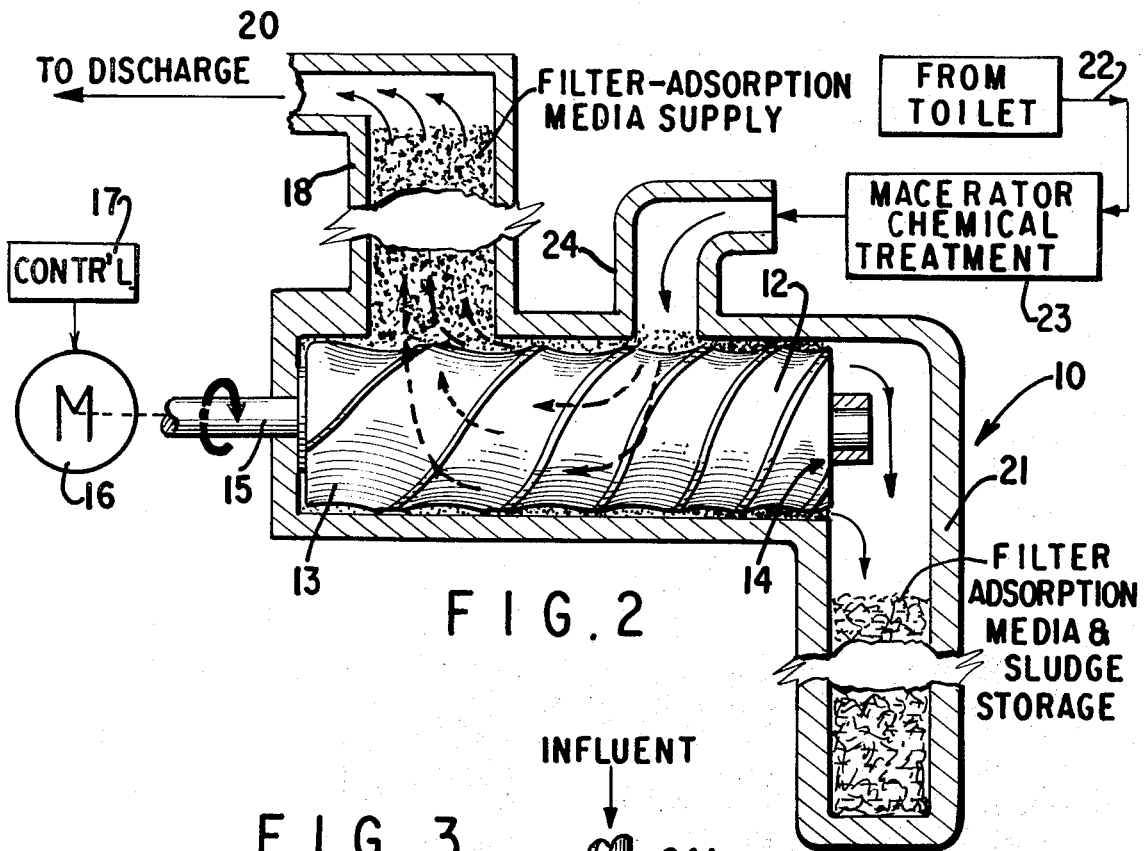
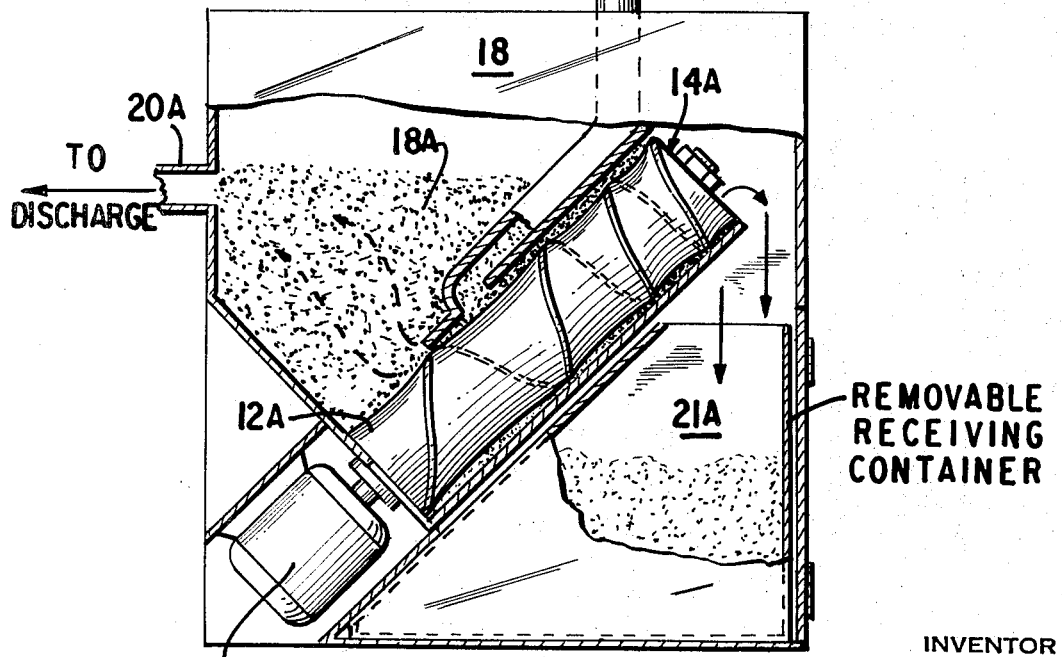

MARINE WASTE DISPOSAL APPARATUS

An increasingly serious ecological and health problem has arisen in many bodies of water as a result of the discharge of raw sewage from recreational water craft equipped with marine toilets. In some coastal areas, the increasing number of such boats has compounded the problem to such an extent that regulations have been placed into force requiring such boats to be equipped with holding tanks or apparatus for treating all waste water discharged overboard. Not only must the waste be treated under proposed standards, but it must be effectively treated so that the effluent discharged overboard meets higher standards than available with present apparatus.

It is one of the objects of the present invention to provide improved waste disposal apparatus for marine toilets and the like.

It is another object of the invention to provide a marine waste disposal apparatus which requires a minimum of space, is automatic in operation, and needs a minimum of maintenance and cleaning.

It is a still further object of the invention to provide a marine waste disposal apparatus which is simple in construction and reliable in operation over long periods of time.

A still further object of the invention is to provide a method and apparatus for treating sewage or waste material in a superior manner.

According to one aspect of the present invention, a marine waste or sewage disposal apparatus may comprise a housing having a conveyor therein, such as a screw conveyor with a varying pitch along its length, with the end of the screw conveyor having a greater pitch at the supply end and a smaller pitch at the other or discharge end. The screw conveyor is rotated by suitable means, as may be desired and sewage is introduced into the housing at substantially the central portion of the screw or between the supply and discharge ends. A supply of a filter-adsorption media, such as activated carbon, is located adjacent the supply end of the screw and fed thereto. At the discharge end of the screw, there are provided means for receiving and storing filter-adsorption media and sludge resulting from the compacting of media and filtering of the sewage as the mixture is moved along by the screw toward its discharge end. The sewage moves, in counter-flow relationship through the conveyor screw to the supply end of the screw, and then through the media supply to an effluent discharge. Compacting of the media and sludge causes the liquid of the effluent to move in counter-flow relation to the filter-adsorption media and therethrough.

In the process of the present invention, the sewage is introduced into a filter-adsorption media. The mixture of sewage and media is compacted while moving the mixture in one direction so as to form a filter-adsorption media and sludge mixture. Effluent moves in counter-flow relationship through a supply of a filter-adsorption media to a discharge zone for the effluent.

The sewage can be treated in a "macerator-chlorinator," such as now in use, before it is fed to the screw conveyor.

Other objects, advantages and features of the present invention will become apparent from the accompanying description and drawings, which are merely exemplary.

In the drawings:

FIG. 2 is a schematic drawing of the sewage treatment apparatus; and

FIG. 3 is a schematic side elevational view of a sewage treatment apparatus according to the present invention and particularly adapted for use in limited space.

Preceeding next to the drawings wherein like reference symbols indicate the same parts throughout the various views, a specific embodiment of the present invention will be described in detail.

Figure 1:
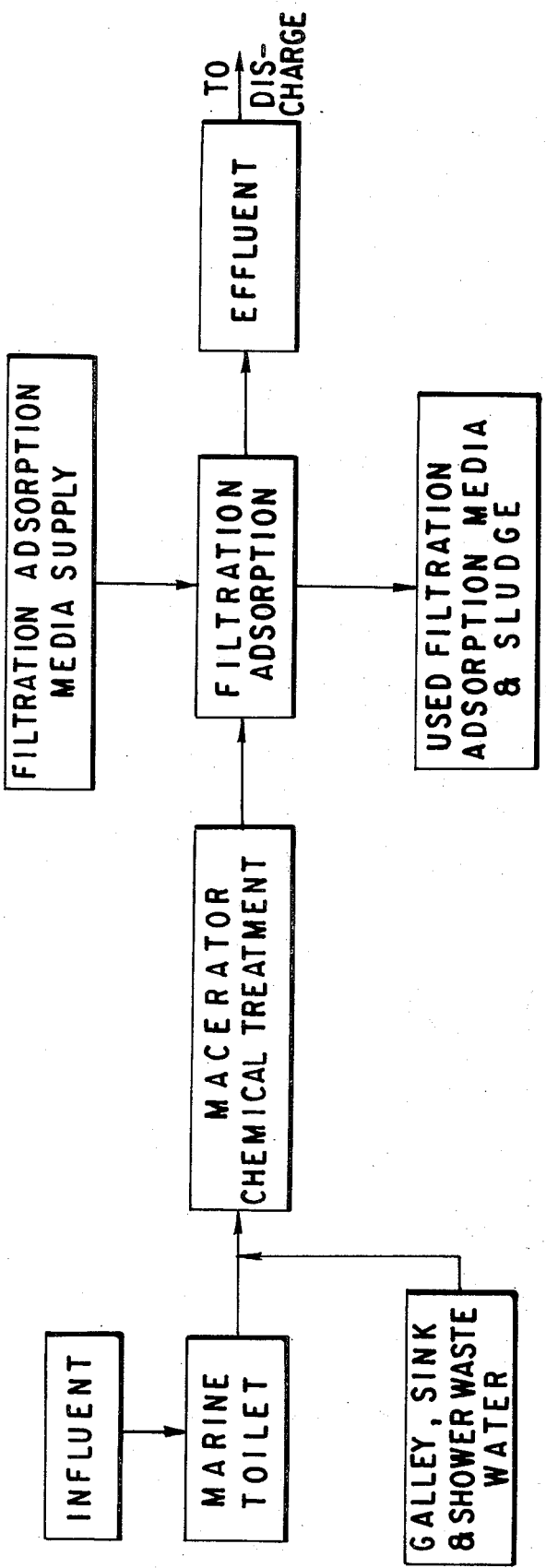
FIG. 1 is a block diagram illustrating schematically the sewage treatment apparatus and method according to the present invention.

As may be seen in FIG. 2, one form of the filtration-adsorption apparatus comprises a unit, indicated generally at 10, having housing 11 in which is rotatably mounted a screw conveyor 12 having a varying pitch thereon which progressively becomes smaller in the direction from supply end 13 of the conveyor to its discharge end 14. The conveyor is mounted upon shaft 15 which is drivingly connected to a suitable source of power such as an electric motor 16. A suitable control 17 can be connected to the electric motor 16 to operate the motor on an intermittent or any desired basis. As an alternative, an automatic control may be provided wherein the electric motor is operated upon each use of the marine toilet or when a predetermined quantity of sewage has been introduced into the housing.

FIG. 1 is a block diagram illustrating the use of the invention. The sewage or waste from a toilet or the waste water can be fed to a conventional macerator and chemical treating device. As an example, macerator-chlorinators are well known. In the present invention, the chemical additive should include a flocculating chemical, such as alum or ferric chloride, as well as the chlorinating chemical, such as hypochlorite. The waste stream from the macerator-chemical treatment device 23 is fed to filtration-adsorption unit 10. The sewage will remain in the macerator-chemical unit 23 until the next flush so that there will be adequate time for treatment before reaching the filtration-adsorption unit 10. Additionally, coarse sand or a filter aid can be added.

A filter-adsorption media supply canister 18 is positioned on housing 11 adjacent the supply end of the screw and contains filter-adsorption media 19, such as activated carbon. The supply canister or means is also provided with a discharge opening 20 through which effluent is discharged in a manner to be presently described.

At the other end of the housing 11 there is provided a receiving container or chamber 21 which may be removable, which receives the mixture of filter-adsorption media and sludge from the discharge end 14 of screw conveyor 12. The receiving container or canister 21 when full should have such a weight so as to facilitate easy handling but which would necessitate only one or two removals during a boating season.

The sewage to be treated flows from a marine toilet through a line 22 into a macerator 23 into which hypochlorite and flocculating agents are fed, as known in the art, so that the sewage is both macerated and chemically treated before being introduced through line 24 at substantially the central portion of the screw conveyor 12.

In FIG. 3, there is shown a modification which comprises the same components as in the apparatus of FIG. 2, but the components are positioned so that the screw conveyor 12A positively displaces the mixture of filter-adsorption media and sewage upwardly to eventually dump the mixture from the discharge end 14A into the removable receiving container 21A. Simultaneously, the effluent will flow downwardly within the housing 11A, into the media supply 18A, and outwardly through the effluent discharge 20A. Since the passage of the waste stream from the toilet to the apparatus is rapid because of the pressure supplied by the usual positive displacement flushing pump, the screw conveyor need operate during flushing only. The media supply container 18A is provided with a charging door 25.

In the operation of the apparatus, it is first necessary to "prime" the discharge end 14 of the housing with a small quantity of the filter-adsorption media to prevent the raw sewage effluent from flowing directly into the discharge container 21.

The influent enters housing 11 after being macerated and chemically treated and mixes with filter-adsorption media fed from the supply end 13 of the conveyor. Upon rotation of conveyor 12, the filter-adsorption media and sludge from the sewage or waste becomes progressively compacted by the increasingly smaller pitch of the screw conveyor adjacent the discharge end 14. The mixture of fluid-adsorption media and sludge is rendered substantially impermeable to liquid in the sewage by the sewage solids trapped in the filter-adsorption media. This causes the effluent liquid to flow through the loosely compacted filter-adsorption media toward the left end or supply end of the conveyor. Thus, the effluent or liquid moves in counter-flow relationship to the movement of the filter-adsorption media.

As the effluent moves through the housing 11 of the unit toward the effluent discharge, the suspended solids are removed by a process of in-depth filtration. The clear liquid is then exposed to the supply of filter adsorption media 19 in the supply canister 18 for a sufficient period of time to reduce the BOD to acceptable levels. The effluent is then discharged at 20 because of displacement by the next flush volume.

As influent from the line 24 continues to flow toward the effluent discharge or the left-hand end of the conveyor (FIGS. 2, 3), the filter-adsorption media in the immediate area of the influent port 24 will become clogged with sewage solids and gradually become impermeable. At this time, screw 12 is rotated by the electric motor 16, and the clogged media is advanced toward the right (FIGS. 2, 3), which forces the media located therein into disposal canister 21. As the screw is rotated, fresh media is drawn from the supply canister 18 into the housing 11 of the unit. The cycle is now ready to be repeated.

The construction of the filter-adsorption unit disclosed herein can be rapidly disassembled for maintenance and cleaning. The unit is inherently fail-safe since, if the electric motor should fail to operate, the system will clog with sewage solids and prevent the passage of sewage to the effluent discharge port. A small screen may be provided in the effluent discharge port 20 to prevent operation of the unit without a suitable charge of filter-adsorption media. There can be no filtration without media present. This will cause the screen to clog rapidly if exposed to raw sewage and prevent the discharge of untreated effluent. The screw conveyor arrangement and positioning, whether moving or not, results in surface removal of the column of filter-adsorption media including sludge within the housing. When the conveyor is moving, the media is scraped from the interior walls of the housing.

As a modification, the screw conveyor 12 can be operated in response to a pressure sensitive switch which is actuated when clogging of the filter surface occurs. This modification would reduce the filter-adsorption media consumption since particulate suspended solids are not introduced into the marine toilet with each usage. Further, instead of an electric motor, a hand crank could be used. Also, it can be used for purposes other than marine disposal.

As an example, a device built in accordance with the principles of the invention has been found to reduce raw sewage from 9,500 COD (Chemical Oxygen Demand), an average of 89 percent reduction. As another example, raw sewage with a 16,300 COD was reduced an average of 99 percent.

Thus, it can be seen that the present invention has disclosed an apparatus and process wherein the waste from a marine toilet or other sewage source is subjected to a combined filtration and adsorption process which removes the larger percentage of the matter from the incoming waste stream and renders the remaining material inoffensive and suitable for overboard discharge. The apparatus is fail-safe in design, simple in construction, easily installed and requires no special training for its use. Further, the apparatus give full consideration to the unique requirements of water craft with respect to safety, reliability, performance under all conditions of pitch and roll and simplicity of operation. Since the apparatus employs a minimum of moving parts, the invention is characterized by a high degree of reliability.

It will be understood that various details of construction and arrangement of parts may be made without departing from the spirit of the invention except as defined in the appended claims.

What is claimed is:

1. In a sewage disposal apparatus for waste material from a vehicular toilet containing sludge, in combination including a housing, filter-adsorption media supply means connected to said housing for receiving particulate media, discharge means connected to said housing for discharging filter-adsorption media and sludge thereform, influent supply means connected to said housing between said supply means and said discharge means for feeding waste material to be treated thereto, conduit means connecting said toilet and said influent supply means, conveying means in said housing carrying said filter-adsorption media from said supply means toward said discharge means and past said influent supply means, said conveying means being a screw with progressively smaller pitch toward the discharge means to progressively increase the compactness of said filter-adsorption media and sludge as it moves past said influent supply means to the discharge means, so that the liquid portion of the influent will move countercurrent through said filter-adsorption media in the area of the larger screw pitch before the influent supply means and where the media is less compact to the filter-adsorption media supply means, the sludge being filtered thereby, means for rotating said screw, and the filter-adsorption material and sludge being increasingly compacted as they move beyond the influent supply means toward the discharge means and are discharged therefrom, the compaction being such that the liquid portion of the influent supply is directed toward said media supply means and is filtered by the filter-adsorption material.

* * * * *